United States Patent [19]
Masui et al.

[11] Patent Number: 5,223,201
[45] Date of Patent: Jun. 29, 1993

[54] METHOD OF MANUFACTURING A LAMINATED BODY

[75] Inventors: Shohei Masui, Kyoto; Kanemitsu Oishi, Siga; Kiyoshi Mitsui, Ichihara; Toshihiro Hosokawa; Ryuichi Ishitsubo, both of Izumi, all of Japan

[73] Assignee: Sumitomo Chemical Company, Osaka, Japan

[21] Appl. No.: 458,430

[22] Filed: Dec. 28, 1989

Related U.S. Application Data

[63] Continuation-in-part of Ser. No. 259,408, Oct. 18, 1988, abandoned, which is a continuation of Ser. No. 106,500, Oct. 9, 1987, abandoned, which is a continuation-in-part of Ser. No. 805,725, Dec. 6, 1985, abandoned.

[30] Foreign Application Priority Data

Dec. 7, 1984 [JP] Japan .................. 59-259728

[51] Int. Cl.⁵ .................. B29C 43/18; B29C 43/20
[52] U.S. Cl. .................. 264/163; 264/266; 264/295; 264/296; 425/112; 425/125; 425/128; 425/292
[58] Field of Search .............. 264/163, 259, 295, 296, 264/266; 425/112, 125, 128, 292

[56] References Cited

U.S. PATENT DOCUMENTS

| | | | |
|---|---|---|---|
| 2,796,634 | 6/1957 | Chellis | 264/296 X |
| 2,797,179 | 6/1957 | Reynolds | 264/296 X |
| 3,611,012 | 10/1971 | Salvarani | 264/295 X |
| 4,225,553 | 9/1980 | Hirota et al. | 264/292 |
| 4,459,092 | 7/1984 | Hatakeyama | 425/112 |

FOREIGN PATENT DOCUMENTS

| | | | |
|---|---|---|---|
| 51-73056 | 6/1976 | Japan | 425/112 |
| 56-5747 | 1/1981 | Japan | 264/259 |
| 56-144156 | 11/1981 | Japan | 264/163 |

*Primary Examiner*—Leo B. Tentoni
*Attorney, Agent, or Firm*—Birch, Stewart, Kolasch & Birch

[57] ABSTRACT

A process for the formation of a laminated body consisting of an upper layer member which covers a hardened synthetic resin is disclosed. The process includes the compression, resulting from a female mold and a male mold approaching each other, of the layer member and molten resins. The final engagement of the molds permits the cutting of the layer member so as to form or shape the ultimate laminated body.

48 Claims, 12 Drawing Sheets

METHOD OF MANUFACTURING A LAMINATED BODY

CROSS REFERENCE TO RELATED APPLICATIONS

This application is a continuation-in-part of copending application Ser. No. 07/259,408 filed Oct. 18, 1988, now abandoned which is a continuation of Ser. No. 07/106,500 filed Oct. 9, 1987 (now abandoned), which is a continuation-in-part of Ser. No. 805,725 filed on Dec. 6, 1985 (now abandoned). The entire contents of all of the above applications are hereby incorporated by reference.

FIELD OF THE INVENTION

The present invention relates to a method of manufacturing a laminated body. More particularly, the present invention relates to a method of manufacturing a laminated body consisting of an upper layer member and a synthetic resin body, by the interaction of a male and female mold.

BACKGROUND OF THE INVENTION

Synthetic resin moldings are presently useful in every field including, for example, automobiles, and home electric appliances. These resins are inexpensive, lightweight, and can be easily shaped. On the other hand, however, these moldings have defects that make them appear cheap-looking, cold feeling and they can be scratched easily. It has been attempted to manufacture these moldings such that they would be more decorative and have a softer feel.

Although a variety of investigations have been made with the object of developing molded articles to satisfy the demands mentioned above, it has been difficult for these molded articles to have been made from a single substance to be capable of being shaped and still be characterized with the desired strength and surface properties.

There has been proposed a method of manufacturing a laminated body, for example, in Japanese Patent Application Disclosure No. 150740/1984, whereby the method of molding the laminated body is performed by the use of a molding apparatus. This apparatus is provided shiftably with a female mold or a male mold and with a slidable frame having a sliding port through which the male mold passes slidably. After holding an upper layer member between the slidable frame and the female mold, and then tightening both molds, after which a molten resin is supplied between the upper layer member and the female mold or the male mold and, finally forming a completed laminated body.

However, the above described method is incapable of manufacturing a laminated body which is characterized with a good appearance, and which is free of wrinkles and tears on the upper layer member covering the synthetic resin. Further, this method requires a cutting process which additionally utilizes a cutting apparatus for cutting the upper layer member after the member had been formed. In using this method, difficulty has been encountered in aligning the center points of the upper layer member and the synthetic resinous body, because the apparatus used in the method is not a single apparatus which performs both, the molding and cutting operations.

Therefore, at the present time, the methods which are widely used to manufacture the different types of laminated bodies, are being assembled with the use of plural materials which have a variety of functions. In this specification, the male mold is defined as the part whose outer side face is the side face of the outermost circumference opposite to each other at the mold-tightening time, while the female mold is defined as the part whose inner side face is the same as the above-mentioned side face of the outermost circumference opposite to each other at the same mold-tightening time.

SUMMARY OF THE INVENTION

The method according to the present invention has been accomplished by solving the above mentioned deficiencies of the prior art and thereby enabling one to obtain a laminated body which is covered with an upper layer member that is free of wrinkles and tears, and further, which is characterized with having the center points of both, the upper layer member and the synthetic resinous body, being in alignment. Also, the method of the present invention is adaptable to mass production because the working process and manufacturing machine are both simplified in planning and in construction.

The method according to the present invention solves the above-mentioned deficiencies of the prior art by providing a method of manufacturing a laminated body consisting of a synthetic resin provided with a layer member thereon.

FIG. 20(A) to FIG. 20(F) indicate the basic method of the present invention, which comprises the following continuous steps of arranging said layer member on a slidable frame surrounding a male mold (see FIG. 20(A));

holding a periphery of said layer member by closing said female mold against said slidable frame (see FIG. 20(B));

preforming said layer member by approaching said female mold in contact with said slidable frame toward said male mold (see FIG. 20(C));

supplying, at any time from said holding and prior to cutting, molten resin between said male mold and said female mold (see FIG. 20(D));

forming or shaping said layer member and said molten resin by compression resulting from said female mold approaching said male mold (see FIG. 20(E)); and cutting prior to or simultaneous with the completion of said forming or shaping, said layer member by engagement of the inner edges of said female mold with the outer edges of said male mold so as to form or shape said laminated body (see FIG. 20(F)).

BRIEF DESCRIPTION OF THE DRAWINGS

The present invention will become more fully understood from the following detailed description and accompanying drawings which are illustrative only, and thus are not limitative of the present invention, and wherein.

DETAILED DESCRIPTION OF THE INVENTION

Figure 1:
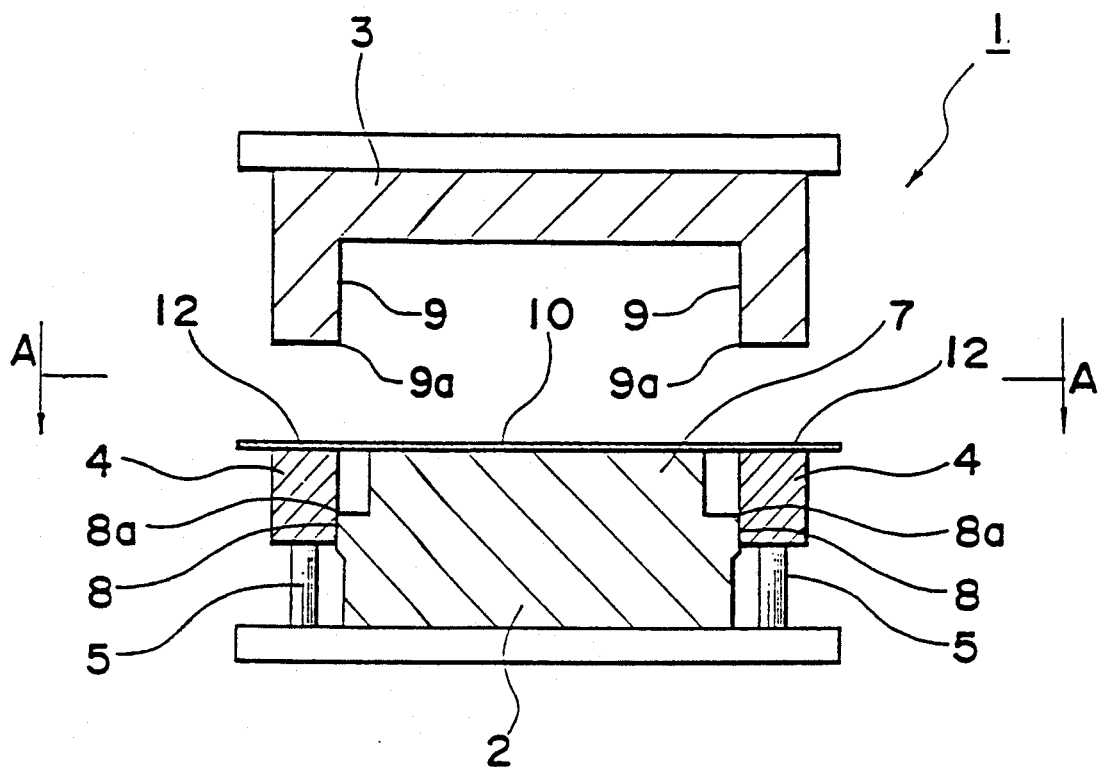
FIG. 1 is a cross sectional view of the arranging process in one embodiment of the present invention.
Figure 2:
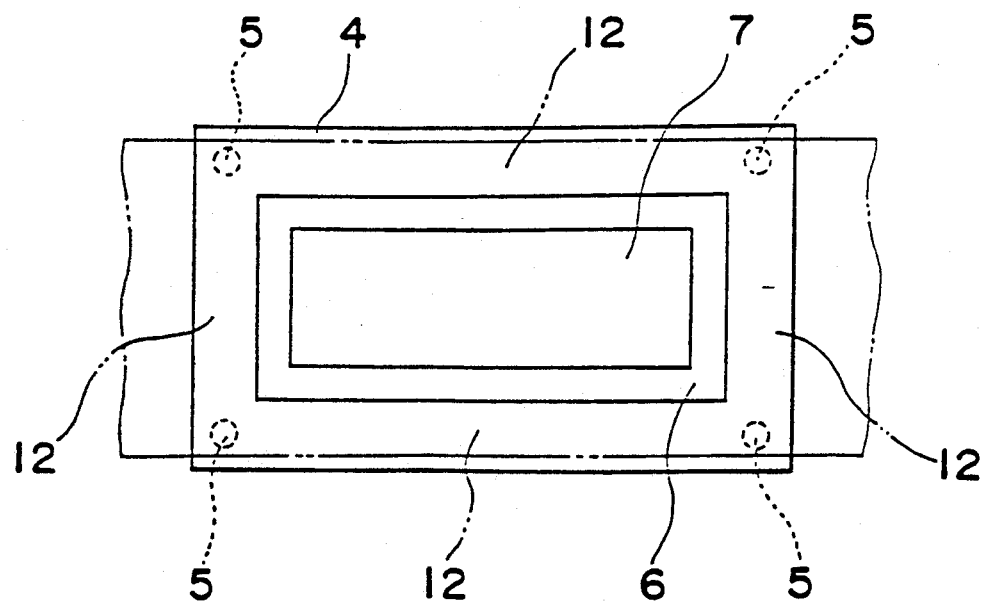
FIG. 2 is a view from the direction of the arrowheads of the line A—A of FIG. 1.
Figure 3:
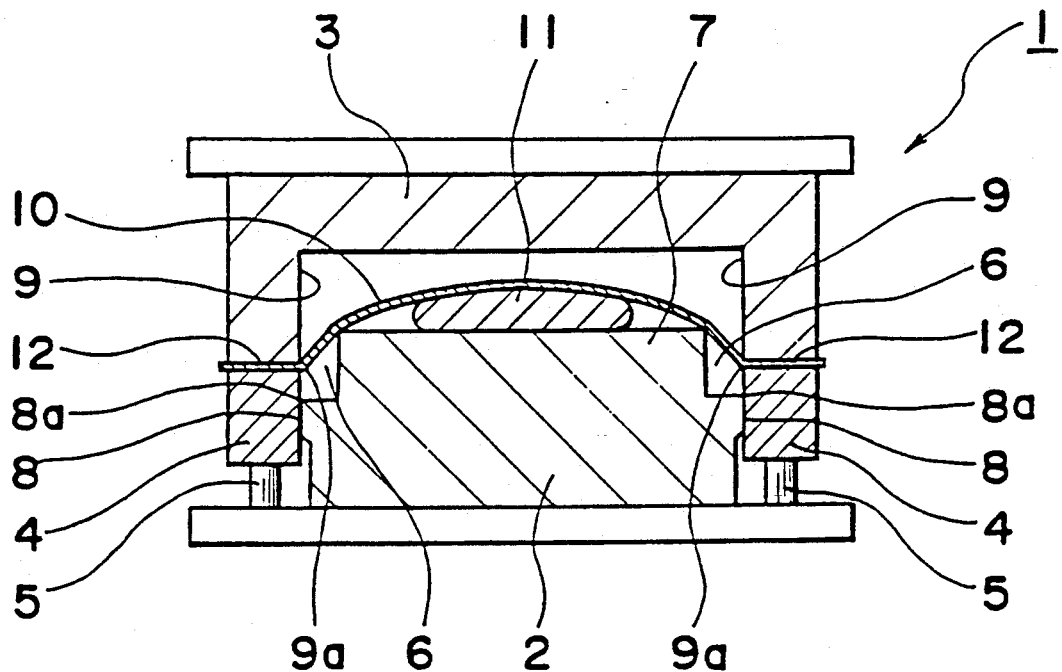
FIG. 3 is a cross sectional view of the supplying process after the resin has been supplied.
Figure 4:
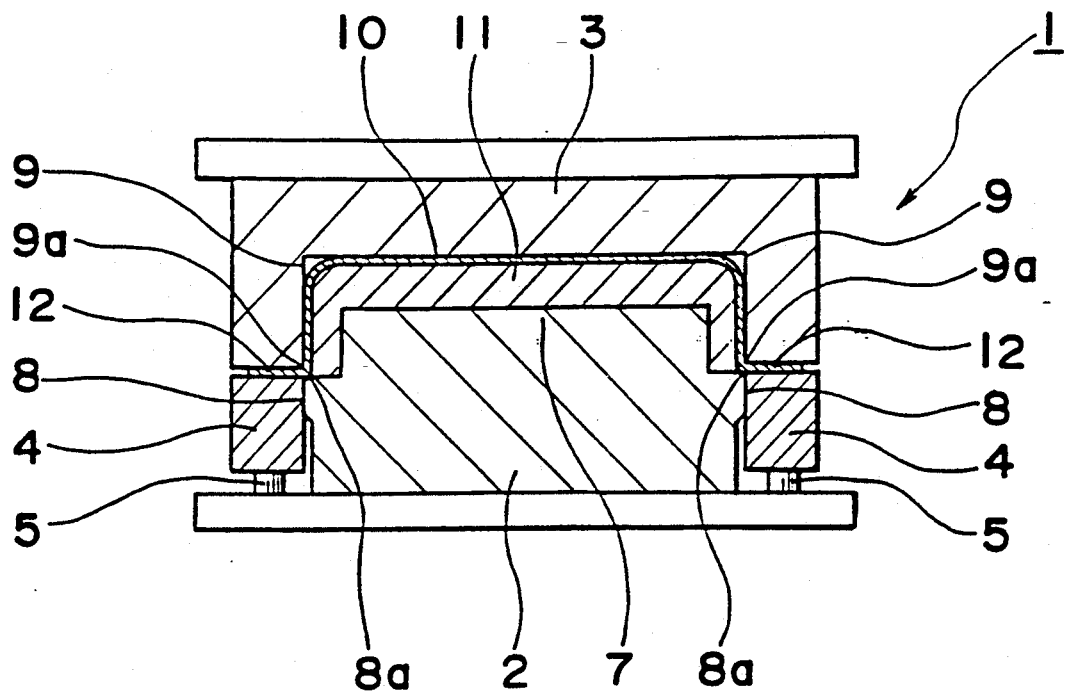
FIG. 4, is a cross sectional view of the forming or shaping process.
Figure 5:
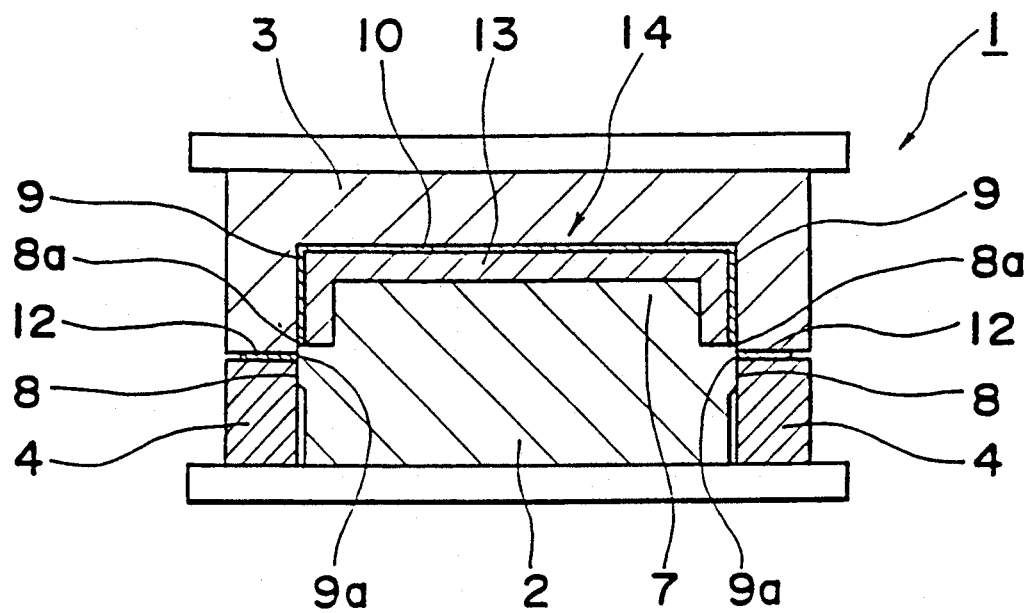
FIG. 5 is a cross sectional view showing the completion of the operation according to the embodiment of FIG. 1.

In all figures, reference numeral 1 indicates a molding apparatus, numeral 2 indicates a male mold, numeral 3 indicates a female mold, numeral 4 indicates a slidable frame, numeral 5 indicates an expanding and contracting means, numeral 6 indicates a sliding opening of the slidable frame 4, numeral 8 indicates the outer side face of male mold 2, numeral 9 indicates the inner side face of female mold 3, numeral 10 indicates an upper layer member, numeral 11 indicates a molten resin, and numeral 14 indicates a laminated body.

The following describes the method of the first embodiment of the present invention as shown in FIGS. 1–8.

Molding apparatus 1 comprises male mold 2, slidable frame 4, expanding and contracting means 5, these three parts being situated below female mold 3 which is supported by a well-known vertical motion mechanism.

Slidable frame 4 which has its upper face located opposite to female mold 3 is mounted shiftably by a plurality of expanding and contracting means 5, and possesses sliding opening 6.

It is permissible to use in expanding and contracting means 5 any known oil pressure cylinder, air pressure cylinder, air pressure spring, urethane spring, steel spring, and the like depending on the required stroke. In this connection, there can be adopted, any of the above-mentioned means, preferably a spring mechanism expanding and contracting means, in response to the approaching force of both molds 2 and 3.

Convex parts 7 of male mold 2 insert into sliding opening 6 which is shiftably slided by outer side face 8 of male mold 2 on the whole circumference.

Male mold 2 and female mold 3 both slide on outer side face 8 and inner side face 9 of the whole circumference.

The cutting edges used to cut upper layer member 10 consist of edge 8a of outer side face 8 of male mold 2 and edge 9a of outer side face 9 of female mold 3.

If upper layer member 10 is made of a soft material such as paper or cloth, it is necessary that edge 8a of outer side face 8 of male mold 2 and edge 9a of outer side face 9 of female mold 3, be made from materials having a different degree of hardness with respect to each other. It is preferable to select from S45C (J.I.S. name of steel) for the actuation side (the side of female mold 3 in this example) and from SKS (J.I.S. name of steel) of SKD11 (J.I.S. name of steel) for the fixed side.

The clearance between edge 8a of outer side face 8 of male mold 2 and edge 9a of outer side face 9 of female mold 3 is commonly a small distance, such as from 0.01 mm to 0.2 mm for cutting upper layer member 10. A small difference in the above clearance distance is permitted, due to the variety of materials and the differences in the thicknesses between these materials which can be used to make upper layer member 10.

In using molding apparatus 1 according to the first embodiment, the method according to the present invention is conducted, for example, in the sequence of steps 1 to 6 described below:

1. To begin with, upper layer member 10 is arranged between slidable frame 4 and female mold 3, that is, upper layer member 10 is placed on slidable frame 4. (See FIG. 1, the arranging process.)

2. Next, when actuating the vertical motion mechanism, female mold 3 moves downward, periphery 12 of upper layer member 10 is held between slidable frame 4 and female mold 3. (The holding process by the molds closing.)

In this process, female mold 3 and male mold 2 are closed.

3. Upper layer member 10 is pre-forming by the force of female mold 3 and male mold 2 approaching each other. (The preforming process by the molds approaching after closing.)

4. And afterwards, molten resin 11 is supplied into the space between upper layer member 10 and male mold 2. (See FIG. 3, the supplying process.)

Thus, slidable frame 4 moves downward following the contraction of expanding and contracting means 5 by the approaching force of holding periphery 12 of upper layer member 10. (Start of the forming or shaping by the molds approaching.)

At this time, the supplying of molten resin 11 is conducted by a known melt-plasticizing means, such as an extruder (not shown), through the molten resin passage (not shown) provided in the interior of male mold 2.

5. After that, female mold 3 and slidable frame 4 is moved downward by actuating the vertical motion mechanism (approaching).

Simultaneously, molten resin 11 is forced to flow causing upper layer member 10 to be compressed against the side of female mold 3, in concert with the squeezing of molten resin 11 into the cavity of female mold 3, with periphery 12 of upper layer member 10 gliding between slidable frame 4 and female mold 3 and with upper layer member 10 extending. (See FIG. 4, the forming or shaping process.)

6. By female mold 3 continuing to descend further, upper layer member 10 is cut by both edges (8a) and (9a) and the approaching of both molds 2 and 3 toward each other is completed. Upper layer member 10 is also molded to be formed or shaped, whereby upper layer member 10 and synthetic resin 13 are united in a laminated body and thereby completing the molding. (See FIG. 5, the cutting process by the molds final approaching.)

Therefore, the center points of upper layer member 10 and the molded synthetic resins 13 are in perfect alignment with each other.

In the present invention, the time when the molten resin 11 is supplied is not restricted to the time mentioned above. It does not matter if molten resin 11 is supplied when both male mold 2 and female mold 3 are made to approach as far as the position where upper layer member 10 is squeezed into the intermediate stage after periphery 12 of upper layer member 10 has been held, or to the position where upper layer member 10 has been cut. Furthermore, molten resin 11 may be supplied before holding upper layer member 10 in the state as shown in FIG. 1.

In the method according to the present invention, the form or shape and appearance of laminated body 14 are influenced by whether the timing of the cutting step of upper layer member 10 is in accord with the timing of the final approaching.

Three specific instances of the timing of the cutting step relative to the timing of the approaching process will be discussed below.

Figure 6:
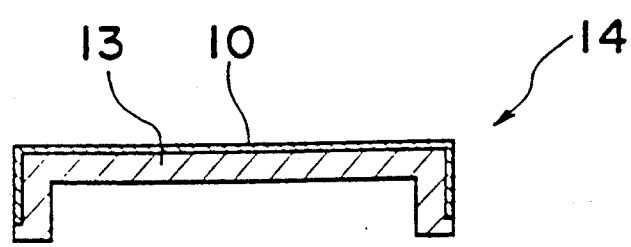
FIG. 6 is a cross sectional view of one laminated body produced according to the present process.

(1) If the cutting step of upper layer member 10 occurs prior to the final approaching, a laminated body 13 as shown in FIG. 6 is obtained.

Figure 7:
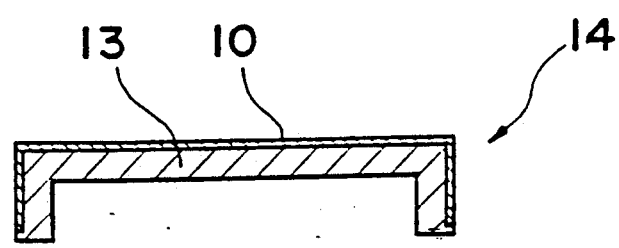
FIG. 7 is a cross sectional view of another laminated body produced according to the present process.

(2) If the cutting of upper layer member 10 occurs before the final approaching, but nearly simultaneous, a laminated body as shown in FIG. 7 is obtained.

Figure 8:
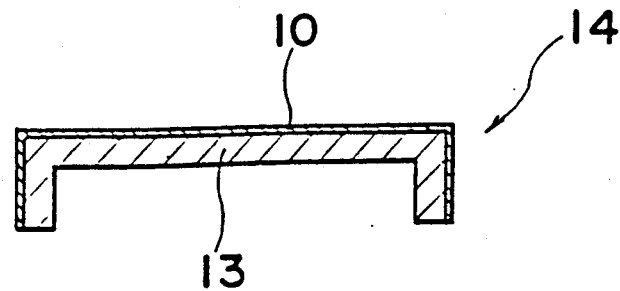
FIG. 8 is a cross sectional view of still another laminated body produced according to the present process.

(3) If the cutting step of upper layer member 10 occurs approximately simultaneous with the time of the final approaching, a laminated body as shown in FIG. 8 is obtained.

In instance 3, upper layer member 10 may be imperfectly cut, and the cutting may be perfected by hand pulling after the molding.

In the method according to the present invention, it will suffice if molten resin 11 is supplied between upper layer member 10 and male mold 2, through at least any one of the molten synthetic resin passages provided at the inside of male mold 2 or at the outside of molding apparatus 1.

Periphery 12 of upper layer member 10 occasionally will shift gradually toward the inside of female mold 3 as the molding progresses, so that it is especially important to set the holding force against upper layer member 10, because upper layer member 10 is likely to become deformed along the form female mold 3 as the latter descends.

When the holding force is too small, upper layer member 10 is caused to excessively glide between upper layer member 4 and female mold 3, and thereby in turn would cause upper layer member 10 to become broader than the area required for laminated body 14 when molten resin 11 is supplied into female mold 3, which in turn would cause wrinkles in laminated body 14. On the other hand, when the holding force is too great, upper layer member 10 would become unable to bear the tensile force created, and would thereby end up breaking.

In the method according to the present invention, for example, if the form or shape of laminated body 14 is simple, it is only necessary that the opposite edges of upper layer member 10 be held. On the other hand, for example, if the form or shape of laminated body 14 is complex, all of the edges of upper layer member 10 must be held by an optimum fixing force, in order to obtain a laminated body 14, which has no wrinkles and in which the upper layer member 10 is not broken.

If the form or shape of laminated body 14 is simple and a fiber having great stretchability is used for upper layer member 10 (there are known fibers having a stretchability of 400%), the gliding behavior as described above for upper layer member 10, does not necessarily occur.

To set the above-mentioned holding force at the time of conducting the method according to the present invention, it is necessary to select the optimum value based on the properties of the materials to be used and the respective forms or shapes of the molded products to be obtained, that is, the stretchiness or the squeezing rate of upper layer member 10, the curvature of every vertex and edges of the molded goods to be obtained etc. The value generally used is of 5-300 kg/cm$^2$ to the cross sectional area of the fixing part.

In setting the required area of upper layer member 10, it is necessary to design upper layer member 10 as to limit the occurrence of trimming loss as much as possible. This should be accomplished, first on the basis of the developing area of laminated body 14 and next by reducing the size of upper layer member 10, while taking into consideration the stretchiness thereof.

The following substances can be used as the material for upper layer member 10: woven stuff, unwoven stuff, metal, fiber, thermoplastic resinous net, paper, metal foil, and sheet or film made of thermoplastic resin and thermoplastic elastomer.

It does not matter if the materials used are decorated with concavoconvex patterns of tie-dyed fabrics, by printing or dyeing, or if foaming bodies are used. It is also possible to use the above mentioned materials which are in the form or shape of a laminated article which has been made by laminating a single or two or more types of materials using adhesive agents and the like.

It is permissible to pre-heat upper layer member 10, if desired, in order to regulate the stress or the stretchiness thereof prior to the supplying of molten resin 11.

For synthetic resin 13 used in the method according to the present invention, it is possible to use all materials ordinarily used in compression molding, injection molding, and extrusion molding. These materials include, for example, nonfoamable or foamable resins made of thermoplastic elastomers such as polypropylene, polyethylene, polystyrene, acrylonitrilestyrene-butadiene block copolymer, thermoplastic resin such as nylon, ethylene-propylene block copolymer, styrene-butadiene block copolymer, and the like. These materials can contain fillers such as inorganic filler, glass fiber, etc., and such additives as pigments, talcs, antistatic agents, and the like.

Finally, concerning the first embodiment, it is possible to move male mold 2 upwards by the vertical motion mechanism instead of moving female mold 3 downwards.

After arranging upper layer member 10 between slidable frame 4 and female mold 3, slidable frame 4 is moved upwards to female mold 3, while periphery 12 of upper layer member 10 is held between slidable frame 4 and female mold 3.

Then male mold 2 is moved upwards toward female mold 3.

With the exception of the moving of male mold 2, the other process steps are the same as those for the first embodiment.

In this case, female mold 3 maintains the first position throughout the whole process.

This minor modified embodiment, the results obtained are about the same as for the aforementioned embodiment process.

Figure 9:
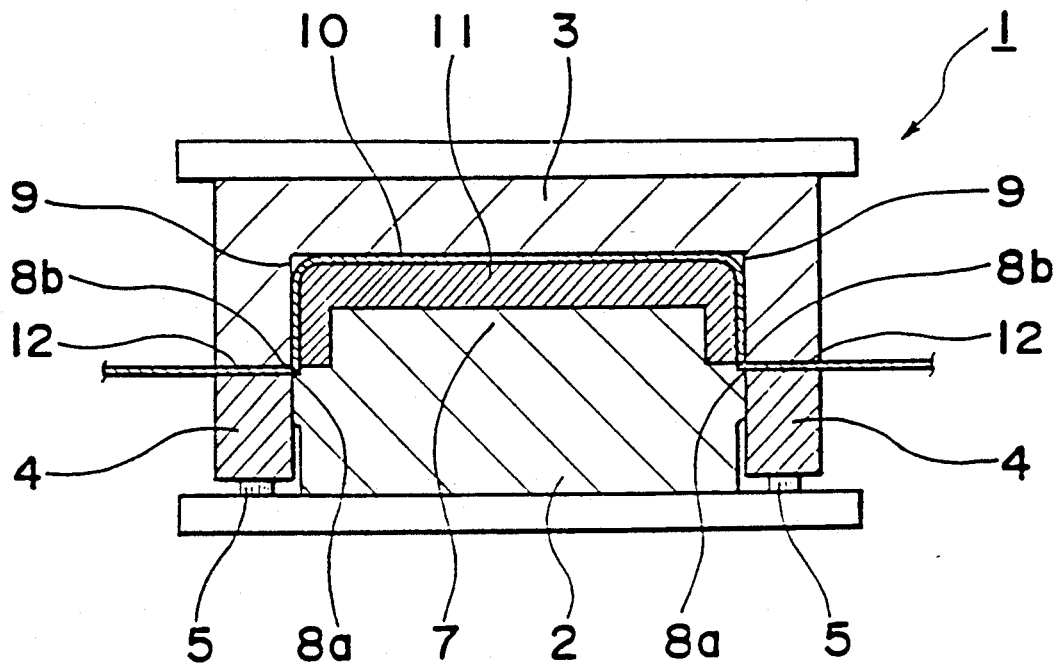
FIG. 9 is a cross sectional view of the forming or shaping process of a second embodiment of the present invention.
Figure 10A:
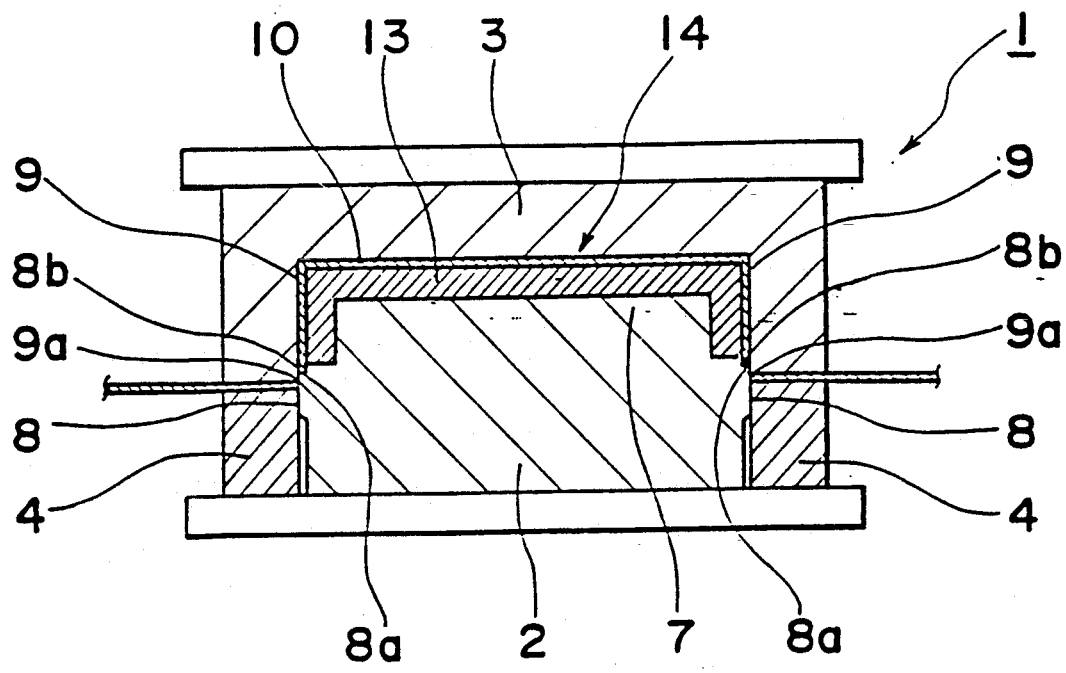
FIG. 10(a) is a cross sectional view at the time of finishing the molding operation according to the modified embodiment.
Figure 10:
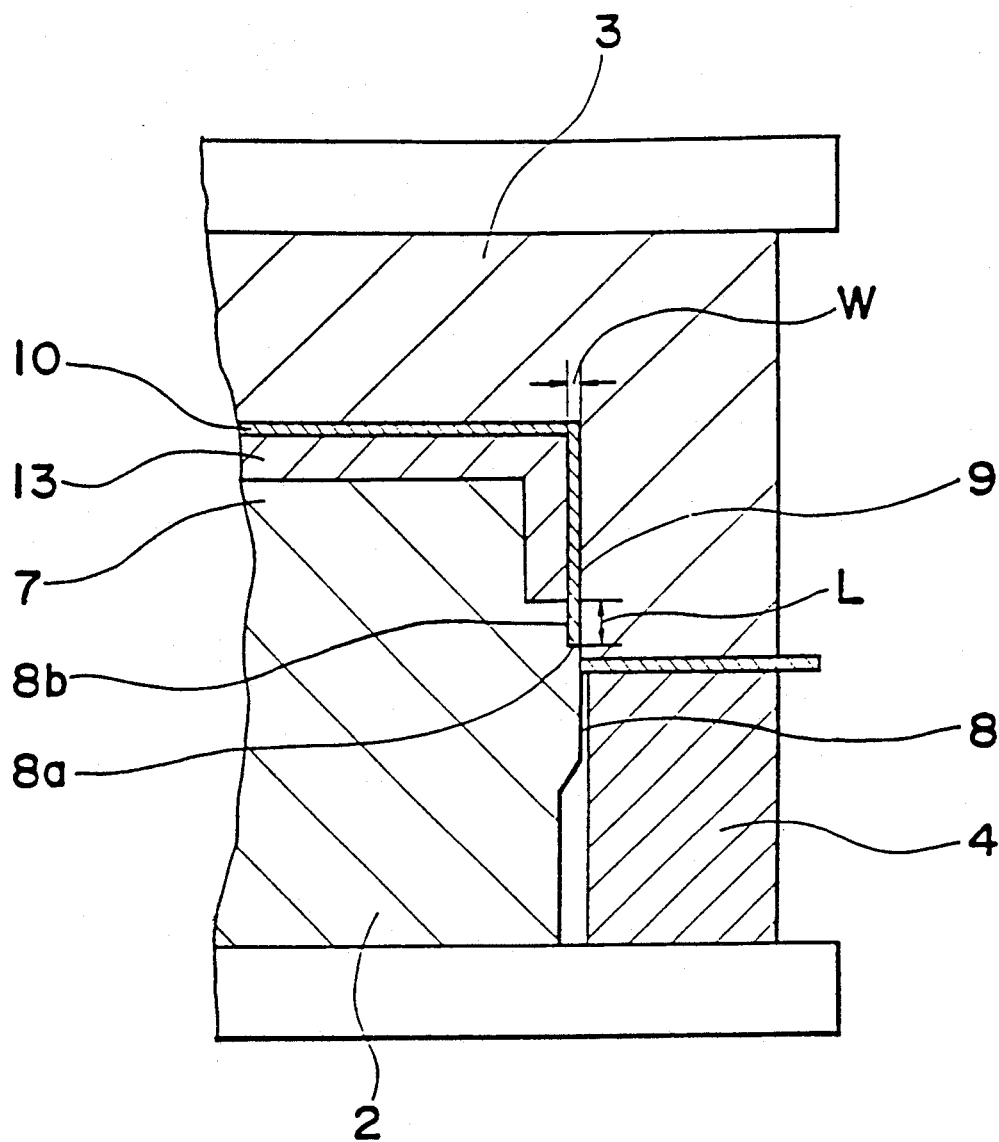
FIG. 10(b) is a partially enlarged view of FIG. 10(a)
Figure 11:
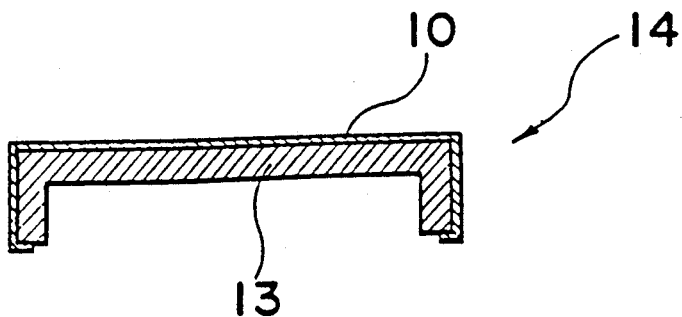
FIG. 11 is a cross sectional view of the laminated body produced according to the second embodiment.
Figure 12:
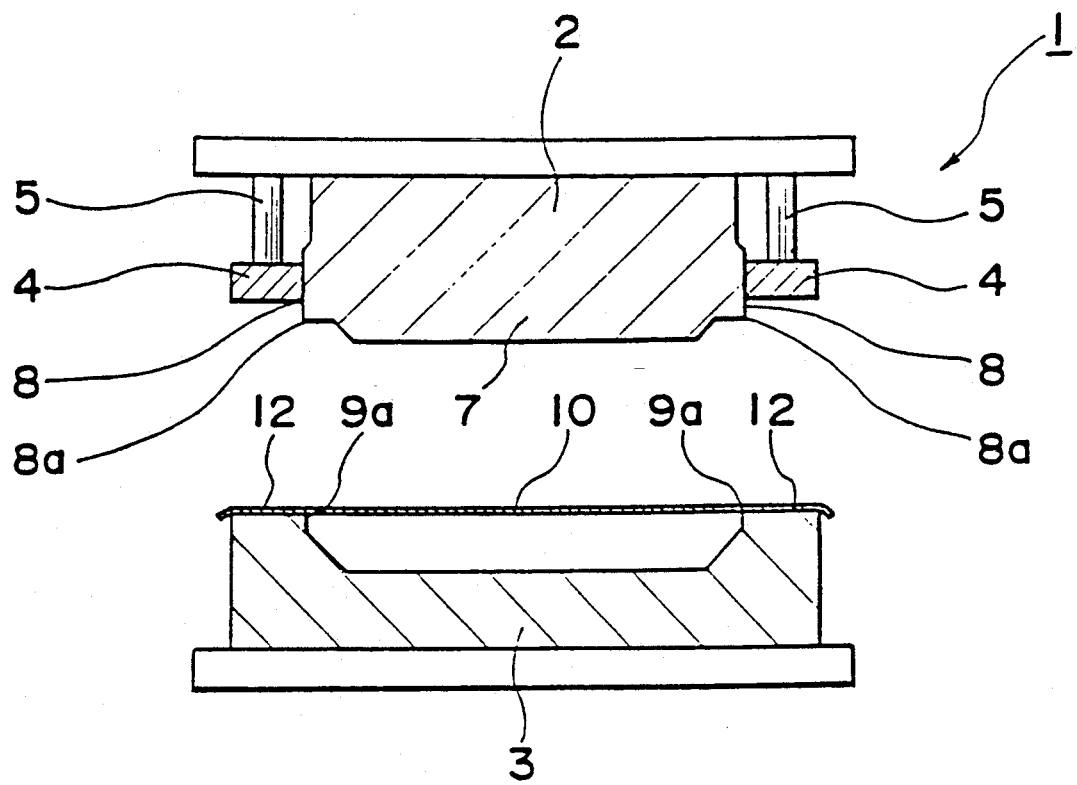
FIG. 12 is a cross sectional view of the arranging process in a third embodiment of the present invention.
Figure 13:
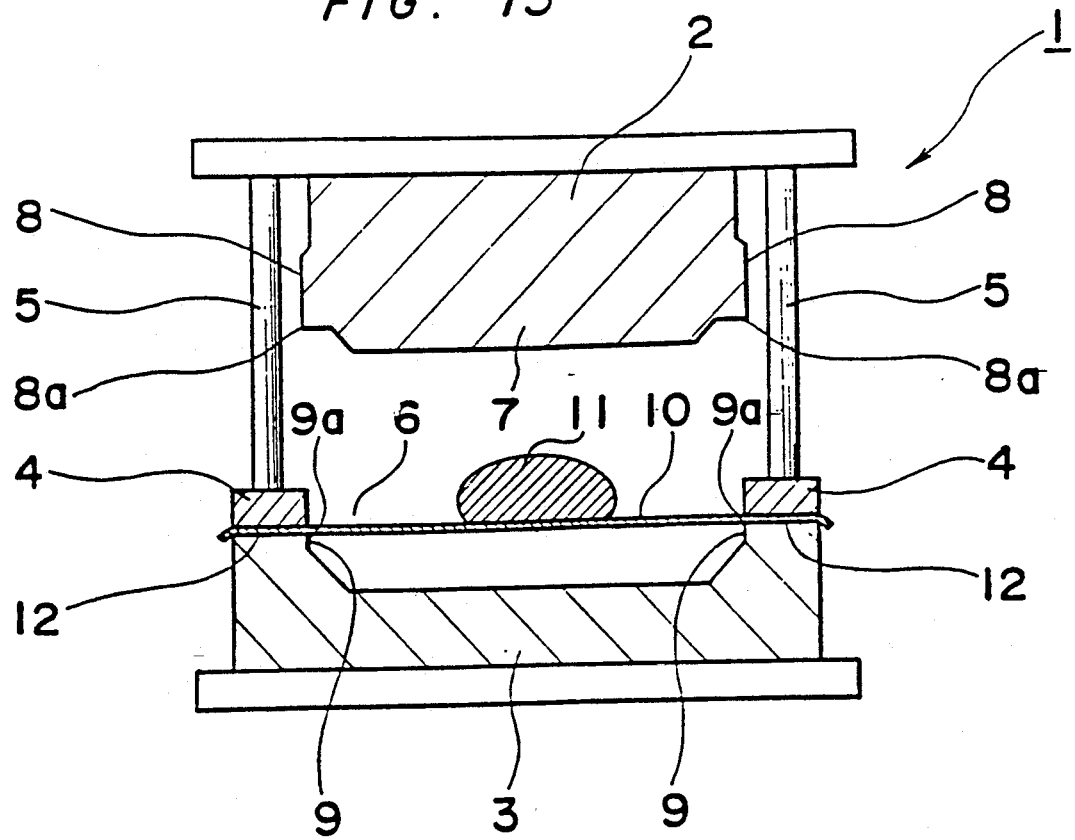
FIG. 13 is a cross sectional view of the supplying process in the embodiment of FIG. 12 after the synthetic resin has been supplied.
Figure 14:
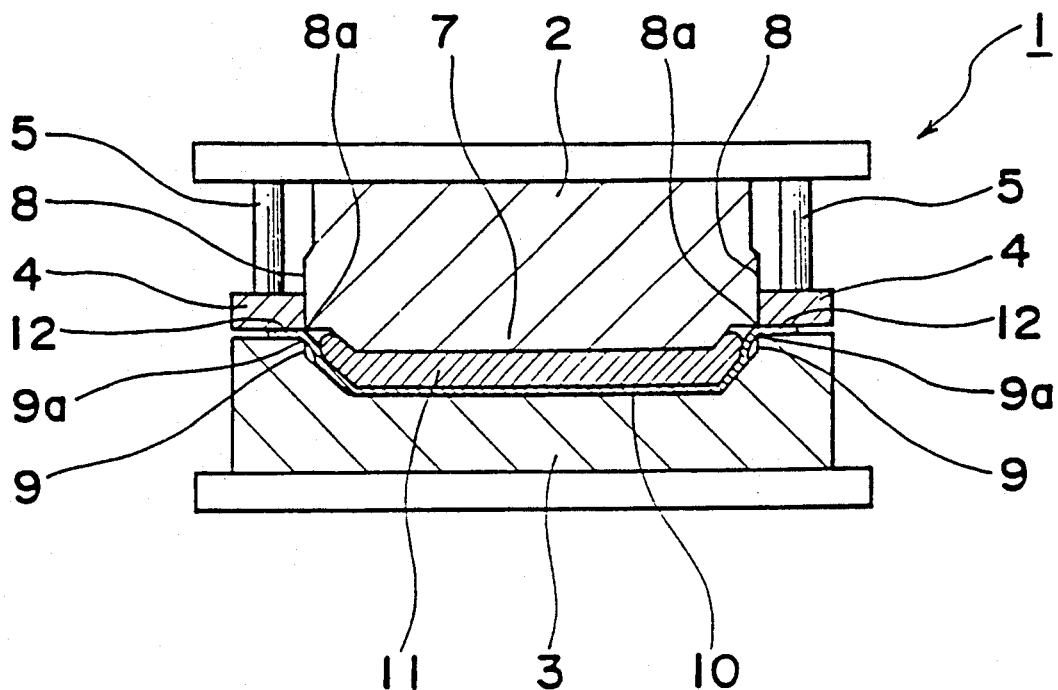
FIG. 14 is a cross sectional view of the forming or shaping process according to the third embodiment.
Figure 15:
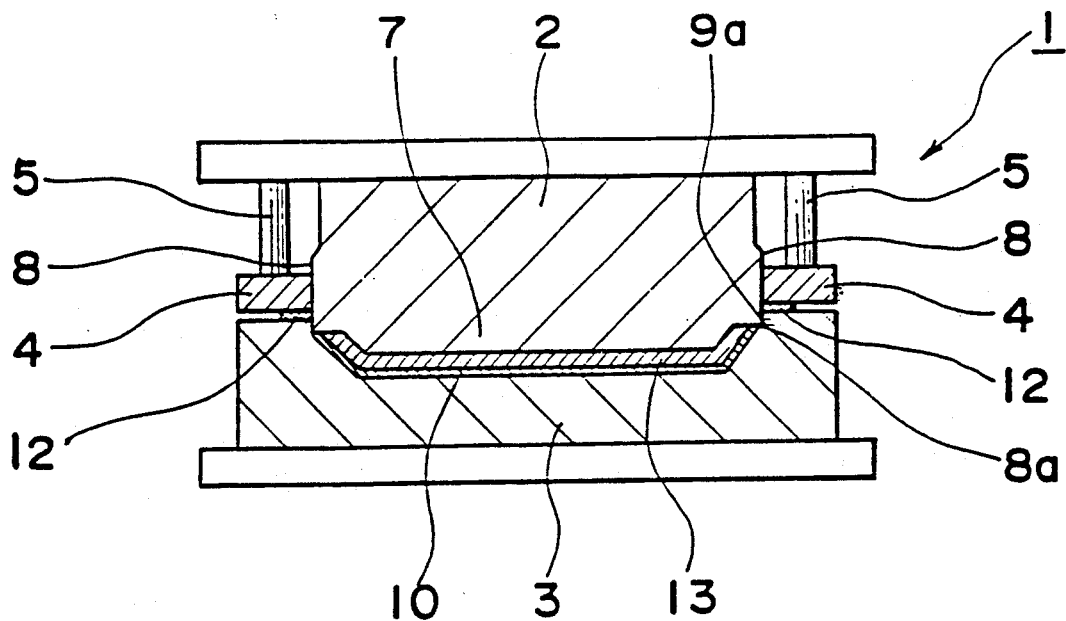
FIG. 15 is a cross sectional view of the final forming or shaping of the laminated body according to the third embodiment.

The following will describe a second embodiment of the present invention as shown in FIGS. 9-11.

Male mold 2 has a notch 8b continuing around the whole circumference in the vicinity of outer side face 8 of edge 8a.

The length (L) of notch 8b is indicated by the form or shape of laminated body 14 and the material of upper layer member 10.

It is not restricted to the same length as the length of each side of outer side face edge 8a of male mold 2 through the whole circumference.

The width (W) of notch 8b is indicated by the size of the most extended distance in the plane direction and the most compressed distance in the thickness direction of upper layer member 10 during the whole molding process.

The clearance between edge 8a of outer side surface 8 of male mold 2 and edge 9a of female mold 3 is commonly a small distance such as from 0.01 mm to 0.2 mm for cutting upper layer member 10, but variation from above clearance value is permitted due to the variety of materials and the differences in the thicknesses between these materials which can be used to make upper layer member 10.

When the method of this embodiment is performed, upper layer member 10 is slidingly inserted into notch 8b prior to the approaching being completed (see FIG. 9), and afterwards, laminated body 14 is prepared at the same time as the completion of the approaching (see FIG. 10).

In laminated body 14 of FIG. 10, the end of upper layer member 10 is expanded out from the outside face of synthetic resin body 13 as in FIG. 10 and FIG. 11. Therefore, the expanded end of upper layer member 10 is bent into an inner direction of synthetic resin body 13, resulting in laminated body 14 as shown in FIG. 11.

In the embodiments described below, although the relative position between male molds 2 and female molds 3 and the upper layer member fixing-frames 4 are subject to change, they have basically the same construction and effect as mentioned previously.

Therefore, it is possible to move male mold 2 further than female mold 3.

In this minor change of the second embodiment, female mold 3 maintains the first position throughout the process.

The following will describe a third embodiment of the present invention as shown in FIGS. 12-15.

Slidable frame 4 is provided shiftably at male mold 2 which is located above female mold 3.

The method according to this embodiment is conducted by following the sequence of the following steps:

(1) Upper layer member 10 is arranged on female 3. (See FIG. 12.)

(2) Next, after holding upper layer member 10 between slidable frame 4 and female mold 3 by means of expanding and contracting means 5 (for expanding and contracting means 5 in this case, it is possible to adopt an air pressure cylinder or an oil pressure cylinder). Molten resin 11 is supplied between upper layer member 10 and male mold 2 from outside molding apparatus 1. (See FIG. 13.)

(3) When the vertical motion mechanism is actuated, male mold 2 descends, as expanding and contracting means 5 contracts, while molten resin 11 flows to compress upper layer member 10 downwards and to the side of female mold 3, in concert with which upper layer member 10 is squeezed while gliding and stretching between slidable frame 4 and female mold 3 into the concave part produced at the side of female mold 3. (See FIG. 14.)

(4) As male mold 2 moves further downward, upper layer member 10 and molten resin 11 unite in a body to be formed or shaped and cut, and to complete the molding.

Finally, concerning the third embodiment, it is possible to move female mold 3 upwards by the vertical motion mechanism instead of moving male mold 2 downwards.

After arranging upper layer member 10 on female mold 3, slidable frame 4 is moved downwards to female mold 3, while periphery 12 of upper layer member 10 is held between slidable frame 4 and female mold 3.

Then female mold 3 is moved upwards toward male mold 3 with the upper layer member fixing-frame 4 making contact.

With the exception of moving female mold 3, the other process steps are the same as those for the third embodiment.

In this case, male mold 2 maintains the first position throughout the whole process.

Figure 16:
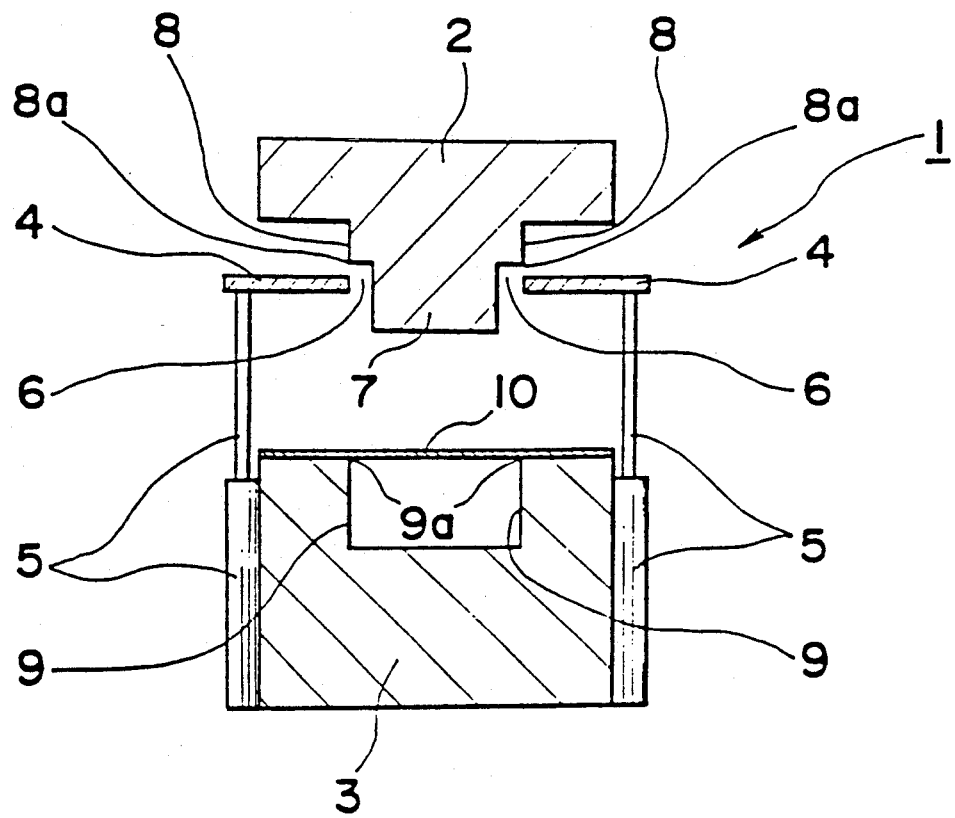
FIG. 16 is a cross sectional view of the arranging process in a fourth embodiment of the present invention.
Figure 17:
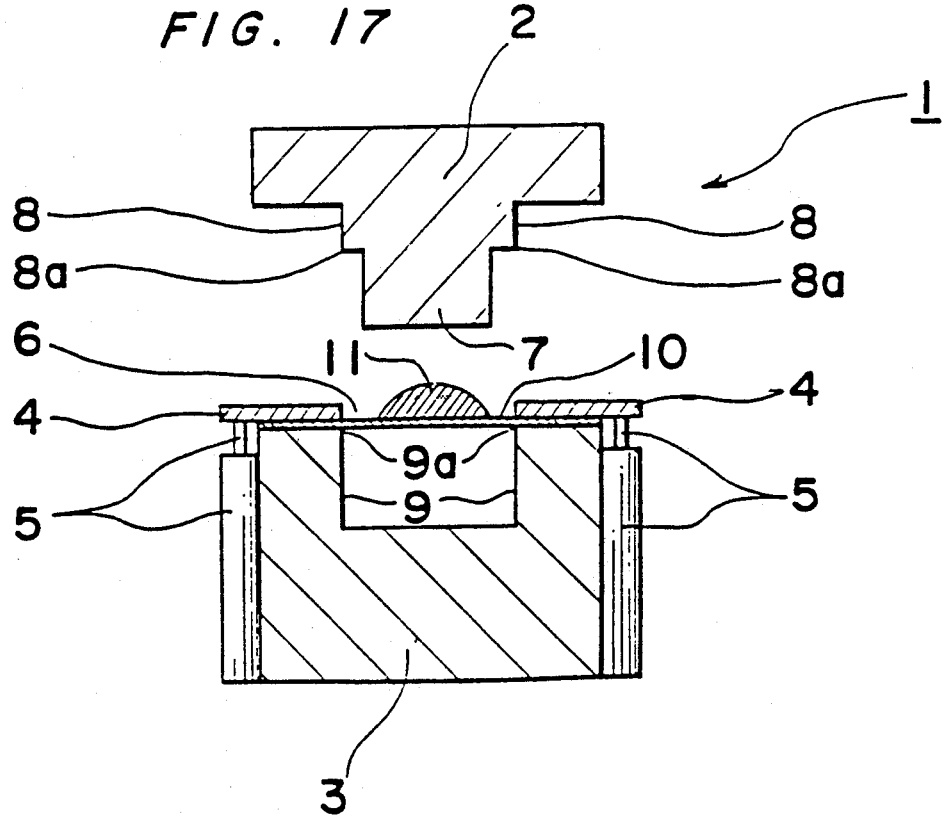
FIG. 17 is a cross sectional view of the fourth embodiment after the resin has been supplied.
Figure 18:
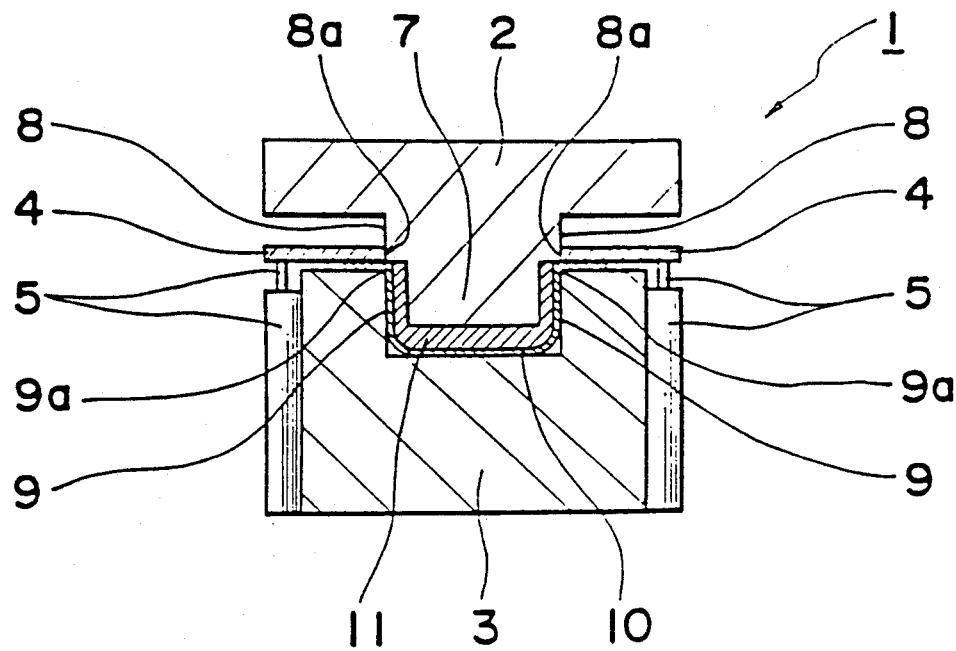
FIG. 18 is a cross sectional view of the mold-tightening process according to the fourth embodiment.

The following will describe a fourth embodiment of the present invention as shown in FIGS. 16-18.

Slidable frame 4 is provided shiftably at male mold which is located above female mold 3.

The method according to this embodiment is conducted according to the following procedure. Upper layer member 10 is arranged on female mold 3 as in FIG. 16. Next, after holding periphery 12 of upper layer member 10 between slidable frame 4 and female mold 3, molten resin 11 is supplied. Upper layer member 10 and molten resin 11 unite in a body to be formed or shaped and cut by mold-tightening, and to complete the molding as described previously. (See FIG. 18.)

Finally, concerning the fourth embodiment, it is possible to move female mold 3 upwards by the vertical motion mechanism instead of moving male mold downwards.

After arranging upper layer member between slidable frame 4 and female mold 3, slidable frame 4 is moved downwards to female mold 3, while periphery 12 of upper layer member 10 is held between slidable frame 4 and female mold 3.

Then female mold 2 is moved upwards toward male mold 2 making contact with slidable frame 4.

With the exception of moving female mold 3, the other process steps are the same as those for the fourth embodiment.

In this case, male mold 2 maintains the first position throughout whole processes.

Figure 19:
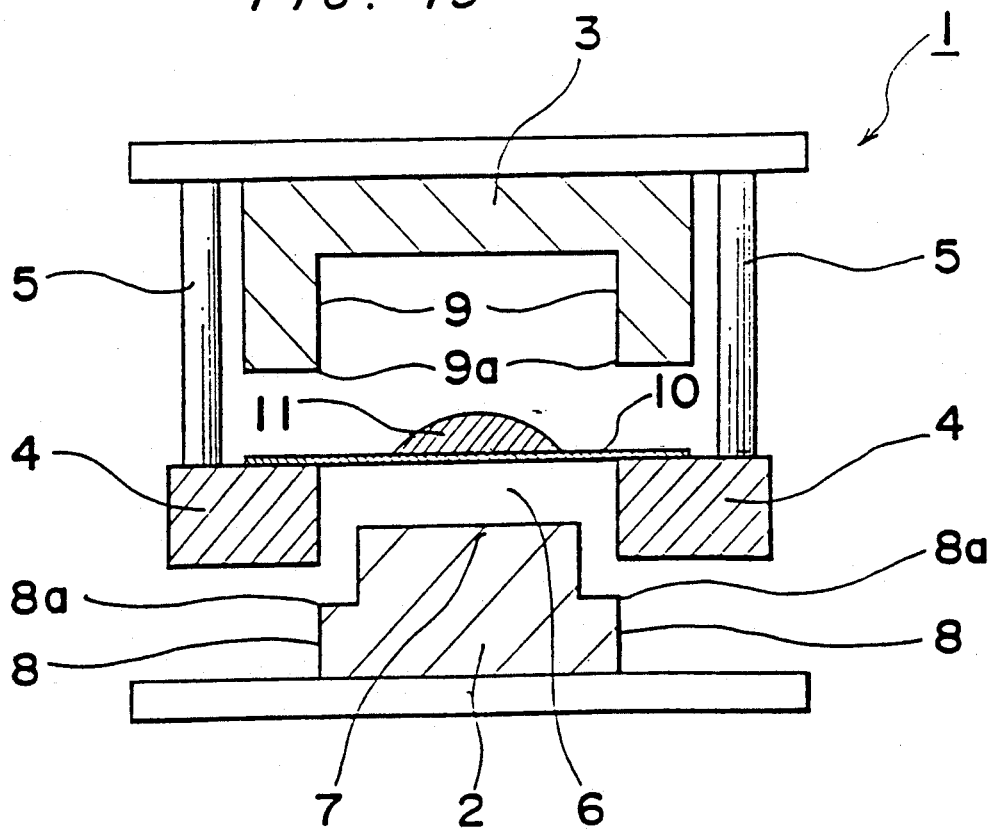
FIG. 19 is a cross sectional view of the supplying process in a fifth embodiment of the present invention.
Figure 20A:
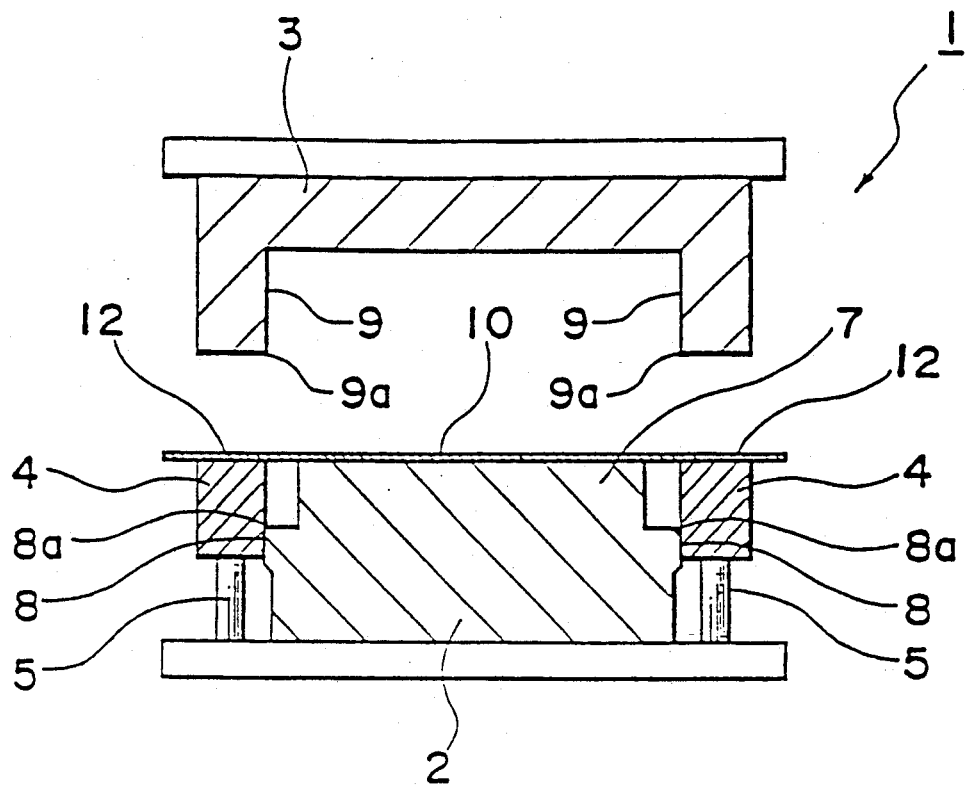
FIG. 20(A) to (F) are cross sectional views of the respective processes, i.e., the arranging process (A), the holding process (B), the preforming process (C), the supplying process (D), the forming or shaping process (E) and the cutting process (F).
Figure 20B:
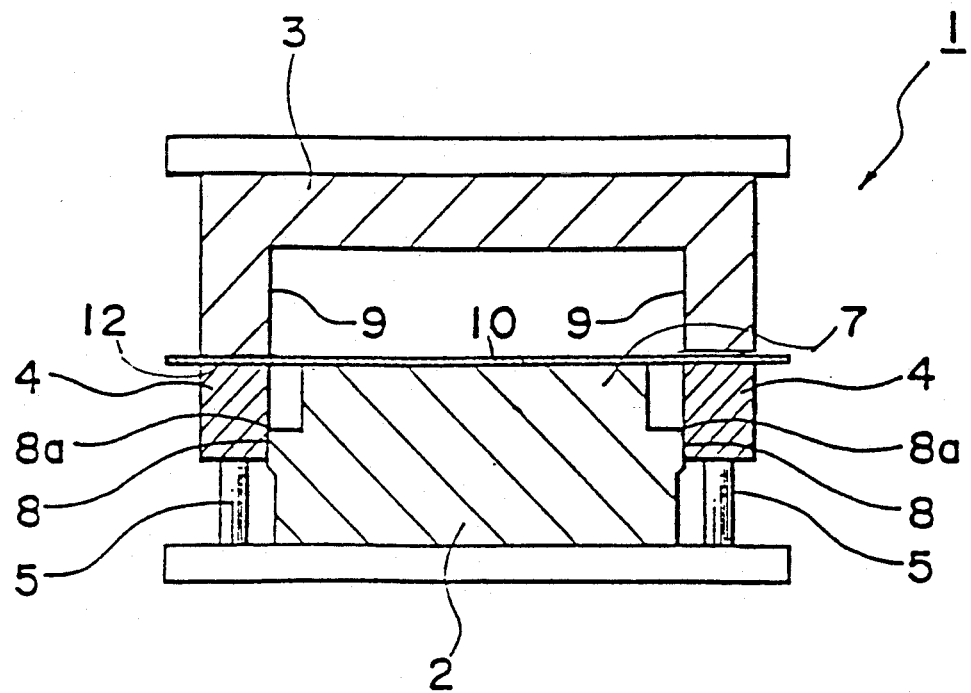
Figure 20:
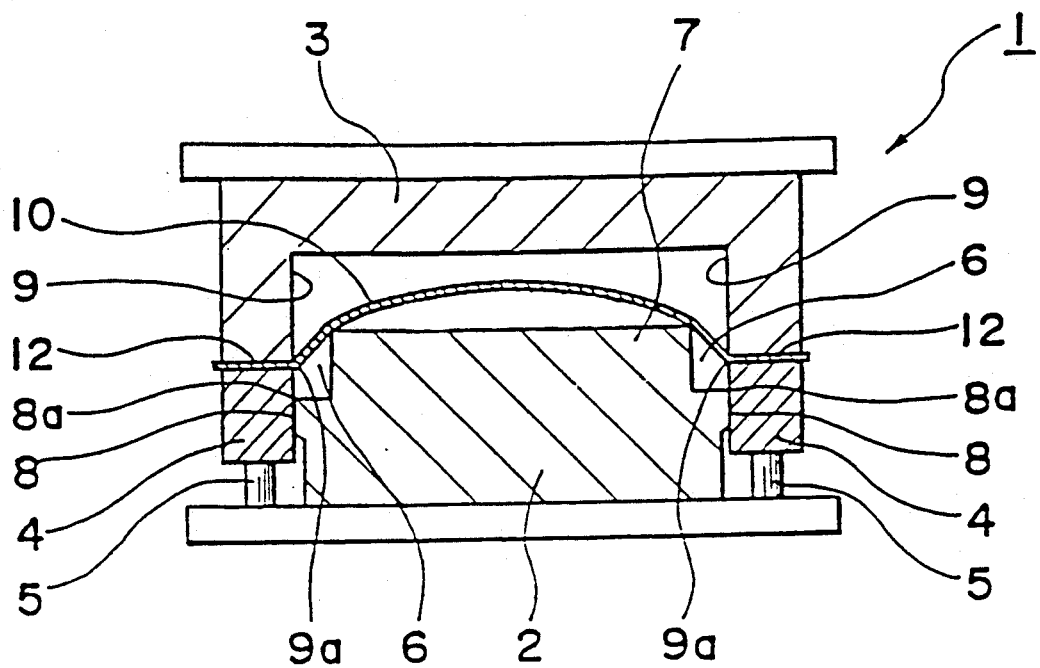
Figure 20:
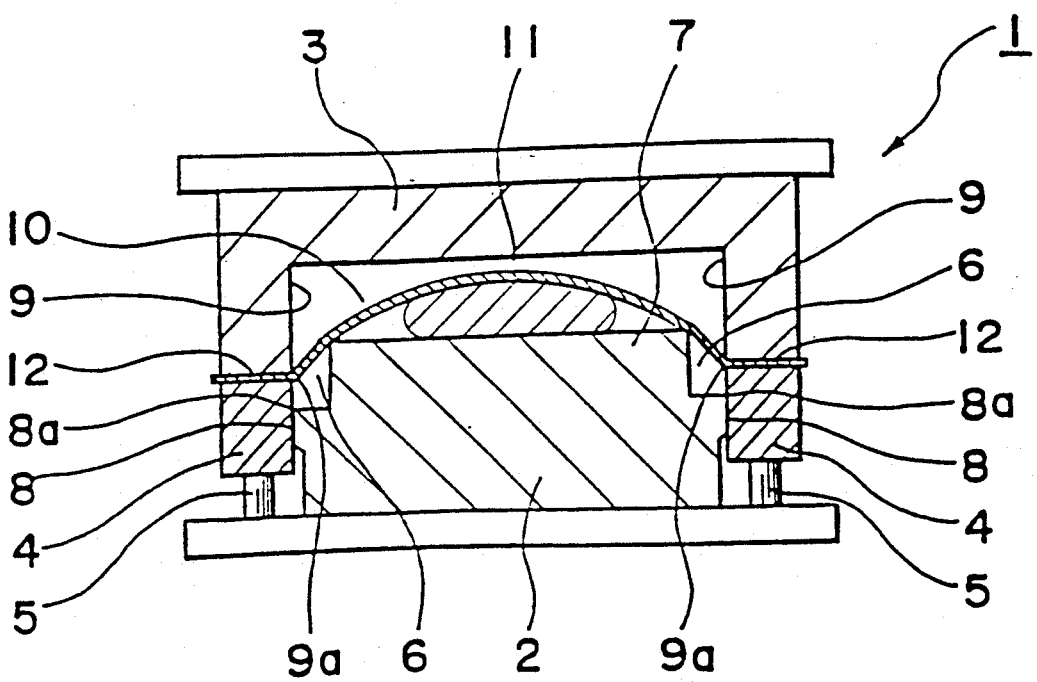
Figure 20E:
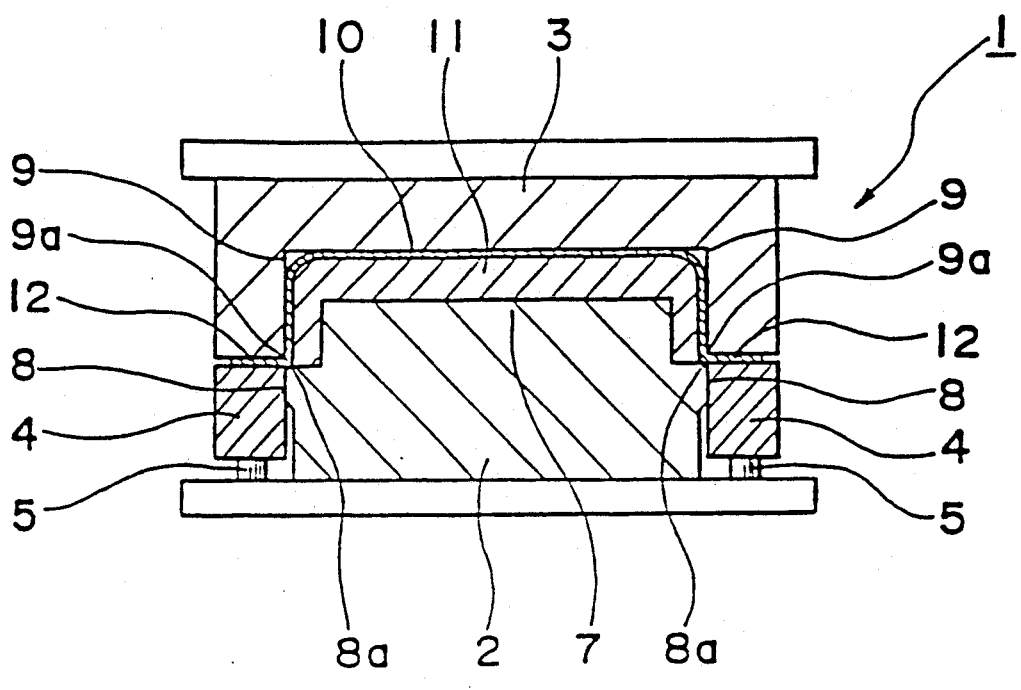
Figure 20F:
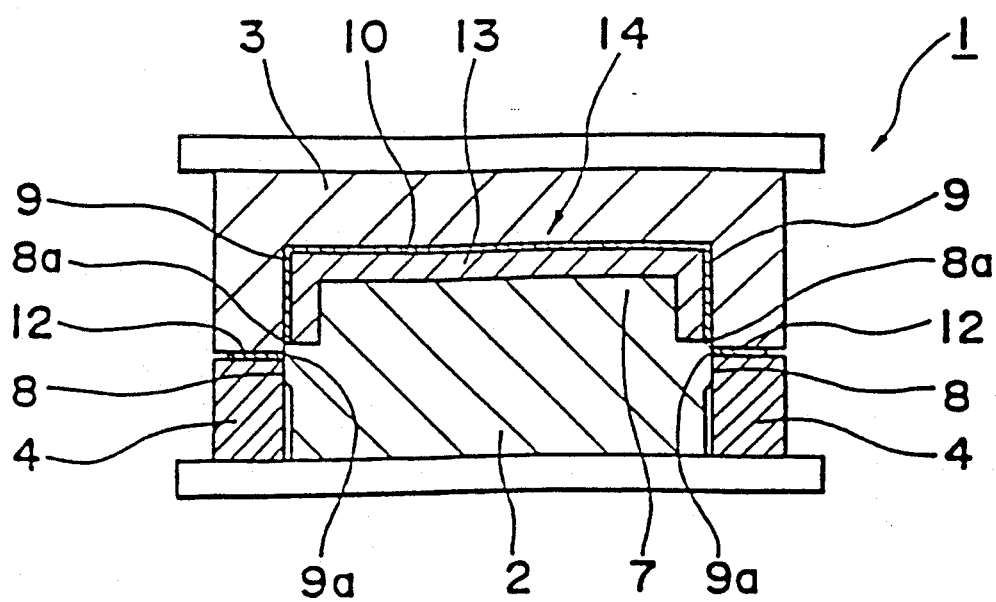

The following will describe a fifth embodiment of the present invention as shown in FIG. 19.

Slidable frame 4 is provided shiftably at female mold 3 which is located above male mold 2.

The method according to this embodiment is conducted by the following steps. Upper layer member 10 is placed on slidable frame 4 as shown in FIG 19. Next, molten resin 11 is supplied through a molten resin passage (not shown) provided in female mold 3. After holding periphery 12 of upper layer member 10 between slidable frame 4 and female mold 3, upper layer member 10 and molten resin 11 unite in a body to be formed or shaped and cut by approaching, and to complete the forming or shaping.

Finally, concerning the fifth embodiment, it is possible to move male mold 2 upwards by the vertical motion mechanism instead of moving female mold 3 downwards.

After arranging upper layer member 10 between slidable frame 4 and female mold 3, while periphery 12 of upper layer member 10 is held between slidable frame 4 and the female mold 3.

Then male mold 2 is moved upwards toward female mold 3.

With the exception of moving male mold 2, the other process steps are the same as those for the fifth embodiment.

In this case, female mold 3 maintains the first position throughout the whole process.

In the method according to the present invention, the separating direction namely means the approaching direction, but it is not always limited to the vertical direction, since the approaching can occur in a horizontal direction.

In the latter case, unless the molten resin 11 should flow out of the molding apparatus, and the supplying of molten resin 11 is performed either after closing to some extent or before closing, while making use of a receiver which had been built in advance within the apparatus.

The method according to the present invention has various advantages in that it does not require any additives, and it can also be adapted to a simple mass production process. It is capable of producing a laminated body having a good appearance without having wrinkles or tears on the upper layer member and without having wrinkles on the bent parts of the upper layer member. As a result, there can be obtained a laminated body which is relatively free of residual stress due to the orientation because the molding of its synthetic resin component is not dependent on an injection molding method and further the laminated body obtained has only a small degree of deformation such as distortion.

Further, the preferable feeling or touch of the laminated body produced in accordance with the method of the present invention can be maintained for a long period of time because the effective pressure required for molding the synthetic resin is small. For example, the method is capable of preventing a foaming layer from being crushed in the case of using a foaming sheet for the upper layer member. The method is also capable of preventing the napped part of a cloth from falling in the case of using a cloth treated by the nap-raising.

It will be evident from the invention being thus described, that it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a laminated body consisting of a thermoplastic resin provided with a layer member thereon by press molding, comprising the following continuous steps of:
   arranging said layer member on a slidable frame surrounding a male mold;
   holding a periphery of said layer member by closing a female mold against said slidable frame;
   preforming said layer member by approaching said female mold in contact with said slidable frame toward said male mold;
   supplying, at any time from said holding and prior to cutting, molten resin between said male mold and said female mold;
   forming or shaping said layer member and said molten resin by compression resulting from said female mold approaching said male mold;
   cutting, prior to or simultaneous with the completion of said forming or shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

2. The method of claim 1, wherein said layer member provided on the thermoplastic resin, substantially covers the thermoplastic resin.

3. The method of claim 1, wherein said layer member provided on the thermoplastic resin covers all of the thermoplastic resin.

4. The method of claim 1, wherein said layer member provided on the thermoplastic resin covers all of the thermoplastic resin and wherein the edges of said layer member protrudes beyond the covered thermoplastic resin.

5. The method of claim 1, wherein said molten resin is supplied via a molten resin passage provided in said male mold or said female mold.

6. The method of claim 1, wherein said molten resin is supplied from outside said male mold or said female mold.

7. A method of manufacturing a laminated body consisting of a thermoplastic resin provided with a layer member thereon, comprising the following continuous steps of:
   arranging said layer member on a slidable frame surrounding a male mold;
   holding a periphery of said layer member by closing a female mold against said slidable frame;
   preforming said layer member by approaching said female mold in contact with said slidable frame toward said male mold;
   supplying, at any time from said holding and prior to cutting, molten resin between said male mold and said female mold;
   forming or shaping said layer member and said molten resin by compression resulting from said male mold approaching said female mold;

cutting, prior to or simultaneous with the completion of said forming or shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

8. The method of claim 7, wherein said layer member provided on the thermoplastic resin, substantially covers the thermoplastic resin.

9. The method of claim 7, wherein said layer member provided on the thermoplastic resin covers all of the thermoplastic resin.

10. The method of claim 7, wherein said layer member provided on the thermoplastic resin covers all of the thermoplastic resin and wherein the edges of said layer member protrudes beyond the covered thermoplastic resin.

11. The method of claim 7, wherein said molten resin is supplied via a molten resin passage provided in said male mold or said female mold.

12. The method of claim 7, wherein said molten resin is supplied from outside said male mold or said female mold.

13. A method of manufacturing a laminated body consisting of a thermoplastic resin provided with a layer member thereon, comprising the following continuous steps of:
  arranging said layer member on a female mold;
  holding a periphery of said layer member by closing said female mold against a slidable frame;
  preforming said layer member by approaching said female mold in contact with said slidable frame toward a male mold;
  supplying, at any time from said holding and prior to cutting, molten resin between said male mold and said female mold;
  forming and shaping said layer member and said molten resin by compression resulting from said male mold approaching said female mold;
  cutting, prior to or simultaneous with the completion of said forming or shaping, said layer member by engagement of the inner edges of aid female mold with the outer edges of said male mold so as to form or shape said laminated body, wherein a width of clearance between inner edges of the female mold and outer edges of the male mold during said step of cutting is from 0.01 to 0.2 mm.

14. The method of claim 13, wherein said layer member provided on the thermoplastic resin, substantially covers the thermoplastic resin.

15. The method of claim 13, wherein said layer member provided on the thermoplastic resin covers all of the thermoplastic resin.

16. The method of claim 13, wherein said layer member provided on the thermoplastic resin covers all of the thermoplastic resin and wherein the edges of said layer member protrudes beyond the covered thermoplastic resin.

17. The method of claim 13, wherein said molten resin is supplied via a molten resin passage provided in said male mold or said female mold.

18. The method of claim 13, wherein said molten resin is supplied from outside said male mold or said female mold.

19. A method of manufacturing a laminated body consisting of a synthetic resin provided with a layer member thereon, comprising the following continuous steps of:
  arranging said layer member on a female mold;
  holding a periphery of said layer member by closing said female mold against a slidable frame;
  preforming said layer member by approaching said female mold in contact with said slidable frame toward a male mold;
  supplying, at any time from said holding and prior to cutting, molten resin between said male mold and said female mold;
  forming or shaping said layer member and said molten resin by compression resulting from said female mold approaching said male mold;
  cutting, prior to or simultaneous with the completion of said forming or shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

20. The method of claim 19, wherein said layer member provided on the thermoplastic resin, substantially covers the thermoplastic resin.

21. The method of claim 19, wherein said layer member provided on the thermoplastic resin covers all of the thermoplastic resin.

22. The method of claim 19, wherein said layer member provided on the thermoplastic resin cover all of the thermoplastic resin and wherein the edges of said layer member protrudes beyond the covered thermoplastic resin.

23. The method of claim 19, wherein said molten resin is supplied via a molten resin passage provided in said male mold or said female mold.

24. The method of claim 19, wherein said molten resin is supplied from outside said male mold or said female mold.

25. A method of manufacturing a laminated body consisting of a thermoplastic resin provided with a layer member thereon, comprising the following continuous steps of:
  arranging said layer member on a slidable frame attached to sides of a female mold;
  holding a periphery of said layer member by closing said female mold against said slidable frame;
  preforming said layer member by approaching said female mold in contact with said slidable frame toward a male mold;
  forming or shaping said layer member and said molten resin by compression resulting from said female mold approaching said male mold;
  cutting, prior to or simultaneous with the completion of said forming and shaping, said layer member by engagement of the inner edges of said female mold with the outer edges of said male mold so as to for or shape said laminated body, wherein a width of clearance between inner edges of the female mold and outer edges of the male mold during said step of cutting is from 0.01 to 0.2 mm.

26. The method of claim 25, wherein said layer member provided on the thermoplastic resin, substantially covers the thermoplastic resin.

27. The method of claim 25, wherein said layer member provided on the thermoplastic resin covers all of the thermoplastic resin.

28. The method of claim 25, wherein said layer member provided on the thermoplastic resin covers all of the thermoplastic resin and wherein the edges of said layer member protrudes beyond the covered thermoplastic resin.

29. The method of claim 25, wherein said molten resin is supplied via a molten resin passage provided in said male mold or said female mold.

30. The method of claim 25, wherein said molten resin is supplied from outside said male mold or said female mold.

31. A method of manufacturing a laminated body consisting of a thermoplastic resin provided with a layer member thereon, comprising the following continuous steps of:
  arranging said layer member on a slidable frame attached to sides of said female mold;
  holding a periphery of said layer member by closing said female mold against said slidable frame;
  preforming said layer member by approaching said female mold in contact with said slidable frame toward a male mold;
  supplying, at any time from said holding and prior to cutting, molten resin between said male mold and said female mold;
  forming and shaping said layer member and said molten resin by compression resulting from said female mold approaching said male mold;
  cutting, prior to or simultaneous with the completion of said forming and shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

32. The method of claim 31, wherein said layer member provided on the thermoplastic resin, substantially covers the thermoplastic resin.

33. The method of claim 31, wherein said layer member provided on the thermoplastic resin covers all of the thermoplastic resin.

34. The method of claim 31, wherein said layer member provided on the thermoplastic resin covers all of the thermoplastic resin and wherein the edges of said layer member protrudes beyond the covered thermoplastic resin.

35. The method of claim 31, wherein said molten resin is supplied via a molten resin passage provided in said male mold or said female mold.

36. The method of claim 31, wherein said molten resin is supplied from outside said male mold or said female mold.

37. A method of manufacturing a laminated body consisting of a thermoplastic resin provided with a layer member thereon, comprising the following continuous steps of:
  arranging said layer member on a slidable frame attached to a female mold;
  holding a periphery of said layer member by closing said female mold against said slidable frame attached to sides of said female mold;
  preforming said layer member by approaching said female mold in contact with said slidable frame toward a male mold;
  supplying, at any time from said holding and prior to cutting, molten resin between said male mold and said female mold;
  forming or shaping said layer member and said molten resin by compression resulting from said female mold approaching said male mold;
  cutting, prior to or simultaneous with the completion of said forming or shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

38. The method of claim 37, wherein said layer member provided on the thermoplastic resin, substantially covers the thermoplastic resin.

39. The method of claim 37, wherein said layer member provided on the thermoplastic resin covers all of the thermoplastic resin.

40. The method of claim 37, wherein said layer member provided on the thermoplastic resin covers all of the thermoplastic resin and wherein the edges of said layer member protrudes beyond the covered thermoplastic resin.

41. The method of claim 37, wherein said molten resin is supplied via a molten resin passage provided in said male mold or said female mold.

42. The method of claim 37, wherein said molten resin is supplied from outside said male mold or said female mold.

43. A method of manufacturing a laminated body consisting of a thermoplastic resin provided with a layer member thereon, comprising the following continuous steps of:
  arranging said layer member on a slidable frame attached to a female mold;
  holding a periphery of said layer member by closing said female mold against said slidable frame attached to sides of said female mold;
  preforming said layer member by approaching said female mold in contact with said slidable frame toward a male mold;
  supplying, at any time from said holding and prior to cutting, molten resin between said male mold and said female mold;
  forming or shaping said layer member and said molten resin by compression resulting from said female mold approaching said male mold;
  cutting, prior to or simultaneous with the completion of said forming or shaping, said layer member by engagement of the inner edges of said female mold with the outer edges of said male mold so as to form or shape said laminated body, wherein a width of clearance between inner edges of the female mold and outer edges of the male mold during said step of cutting is from 0.01 to 0.2 mm.

44. The method of claim 43, wherein said layer member provided on the thermoplastic resin, substantially covers the thermoplastic resin.

45. The method of claim 43, wherein said layer member provided on the thermoplastic resin covers all of the thermoplastic resin.

46. The method of claim 43, wherein said layer member provided on the thermoplastic resin covers all of the thermoplastic resin and wherein the edges of said layer member protrudes beyond the covered thermoplastic resin.

47. The method of claim 43, wherein said molten resin is supplied via a molten resin passage provided in said male mold or said female mold.

48. The method of claim 43, wherein said molten resin is supplied from outside said male mold or said female mold.

* * * * *